United States Patent
Nampo

(10) Patent No.: US 10,970,009 B2
(45) Date of Patent: Apr. 6, 2021

(54) ELECTRONIC APPARATUS AND NON-TRANSITORY STORAGE MEDIUM STORING PROGRAM READABLE BY OPERATION TERMINAL

(71) Applicant: BROTHER KOGYO KABUSHIKI KAISHA, Nagoya (JP)

(72) Inventor: Hiromichi Nampo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/456,866

(22) Filed: Jun. 28, 2019

(65) Prior Publication Data
US 2020/0097219 A1    Mar. 26, 2020

(30) Foreign Application Priority Data
Sep. 21, 2018  (JP) .............................. JP2018-178115

(51) Int. Cl.
  *G06K 15/00*  (2006.01)
  *G06F 3/12*   (2006.01)
  *H04W 4/80*   (2018.01)

(52) U.S. Cl.
  CPC ............ *G06F 3/121* (2013.01); *G06F 3/1234* (2013.01); *G06F 3/1294* (2013.01); *G06F 3/1292* (2013.01); *H04W 4/80* (2018.02)

(58) Field of Classification Search
  CPC ...... G06F 3/121; G06F 3/1234; G06F 3/1294; G06F 3/1292; H04W 4/80
  See application file for complete search history.

(56) References Cited

U.S. PATENT DOCUMENTS

| | | | | |
|---|---|---|---|---|
| 7,148,979 B1 * | 12/2006 | Yanagawa | ........... | G06F 11/0733 358/1.15 |
| 2015/0188611 A1 * | 7/2015 | Tsuzuki | .................. | H04B 5/02 455/41.1 |
| 2018/0183974 A1 * | 6/2018 | Cao | ..................... | H04N 1/32694 |

FOREIGN PATENT DOCUMENTS

| | | |
|---|---|---|
| JP | 2006-212826 A | 8/2006 |
| JP | 2015-126491 A | 7/2015 |

* cited by examiner

*Primary Examiner* — Moustapha Diaby
(74) *Attorney, Agent, or Firm* — Kenealy Vaidya LLP

(57) ABSTRACT

An electronic apparatus includes: an operation mechanism; a communication interface that communicates with an operation terminal; and a controller. The controller performs: determining whether a transmission request instruction is received from the operation terminal; when the controller determines that the transmission request instruction is received, obtaining operation information; determining whether an error event has been caused in at least one of the controller and the operation mechanism; and when the controller determines that the error event has been caused, transmitting an error report including a type of the caused error event, to the operation terminal via the communication interface.

17 Claims, 10 Drawing Sheets

ELECTRONIC APPARATUS AND NON-TRANSITORY STORAGE MEDIUM STORING PROGRAM READABLE BY OPERATION TERMINAL

CROSS REFERENCE TO RELATED APPLICATION

The present application claims priority from Japanese Patent Application No. 2018-178115, which was filed on Sep. 21, 2018, the disclosure of which is herein incorporated by reference in its entirety.

BACKGROUND

The following disclosure relates to an electronic apparatus configured to transmit and receive information and to a non-transitory storage medium storing a program readable by a computer of an operation terminal.

Printing apparatuses as one example of an electronic apparatus perform printing on a printing medium. The printing apparatus is used in connection to an operation terminal in some cases. That is, when operated by a user, the operation terminal creates print data based on a desired print layout on the printing medium (e.g., a printing tape) and transmits the created print data to the printing apparatus. The printing apparatus performs printing on the printing medium based on the received print data.

SUMMARY

In this printing apparatus, a high temperature of a thermal head in some cases causes an error in, e.g., an operation mechanism, for example. In the case where the printing apparatus includes a display, contents of this error event are displayed on the display. In the case where the printing apparatus does not include a display, the contents of the error event are, for example, printed on the printing medium to be notified to the user. In the case where the display is, for example, an LED lamp, however, the user needs to interpret the contents of the error event from an illuminating state of the LED lamp. In the case where the contents of the error event are printed on the printing medium, the printing medium is wasted in each error.

Accordingly, an aspect of the disclosure relates to an electronic apparatus capable of notifying a user of contents of an error event with easier operation, and to a non-transitory storage medium storing a program readable by a computer of an operation terminal.

In one aspect of the disclosure, an electronic apparatus includes: at least one operation mechanism; a communication interface configured to communicate, over short-range wireless communication, with an operation terminal having been brought into contact with or having approached the communication interface; and a controller configured to control the at least one operation mechanism and the communication interface, wherein the controller is configured to perform: executing a request determining processing in which the controller determines whether a transmission-request instruction for transmission of information is received from the operation terminal; when the controller determines that the transmission-request instruction for transmission of information is received, executing an information obtaining processing in which the controller obtains operation information relating to the at least one operation mechanism and the controller; executing an error determining processing in which the controller determines based on the obtained operation information whether an error event has been caused in at least one of the controller and one of the at least one operation mechanism; and when the controller determines that the error event has been caused, executing an error transmitting processing at which the electronic apparatus transmits an error report including a type of the caused error event, to the operation terminal via the communication interface.

Another aspect of the disclosure relates to a non-transitory storage medium storing a program readable by a computer of an operation terminal. The operation terminal includes: a display configured to display information; and a communication interface configured to communicate with an electronic apparatus over short-range wireless communication. When executed by the computer, the program causes the operation terminal to execute: a receiving processing in which the operation terminal receives an error report including a type of an error event having been caused in the electronic apparatus, via the communication interface; and a display processing in which the operation terminal controls the display to display the type of the error event and the number of error events which are contained in the received error report.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Figure 1:
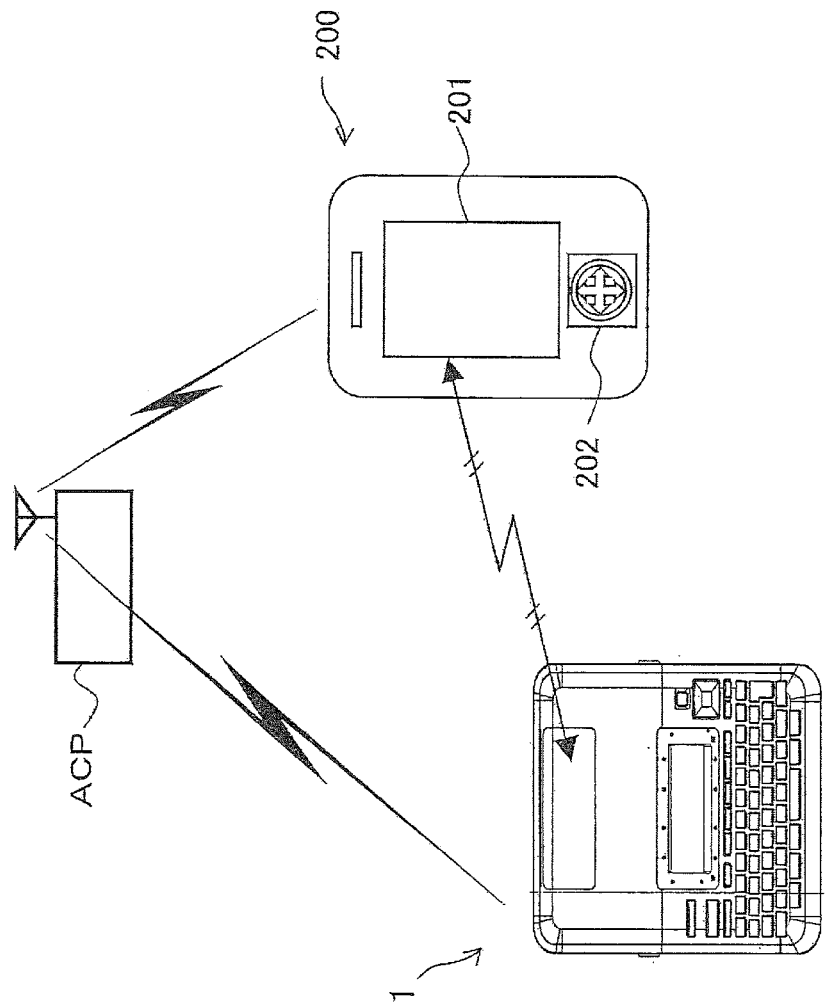
FIG. 1 is a view for explaining a system configuration for a printer according to one embodiment.

Hereinafter, there will be described one embodiment by reference to the drawings. It is noted that the same reference numeral is used in this specification and drawings to designate elements having substantially the same function as a principle. Duplicated explanations for these elements are omitted as needed.

System Configuration

There will be next described a system configuration for a printer 1 according to one embodiment with reference to FIG. 1. As illustrated in FIG. 1, the system configuration includes the printer 1, an operation terminal 200, and an access point ACP (a base station).

The printer 1 is one example of an electronic apparatus and a printing apparatus and includes a conveyor and a printing device, which will be described below, to perform printing on a printing medium. While the printer 1 according to the present embodiment is operated by electric power supplied from a battery, the present disclosure is not limited to this configuration. The operation terminal 200 is configured to perform wireless communication with the printer 1 and operable by a user to transmit information, such as print data, control signals, and commands, to the printer 1.

The printer 1 according to the present embodiment and the operation terminal 200 are capable of communicating with each other according to the Near Field Communication (NFC) standards and capable of performing mutual-recognition wireless communication (as one example of second wireless communication) using, e.g., Wi-Fi (registered trademark), for example. NFC is one of standards for short-range wireless communication and is a set of communication protocols that enable short-range wireless communication. Communication according to the NFC standards may be hereinafter referred to as "NFC communication". The NFC communication is one example of first wireless communication. The access point ACP is provided at an indoor or outdoor placement so as to be connected to the printer 1 and the operation terminal 200 so as to enable transfer of information between the access point ACP and each of the printer 1 and the operation terminal 200. The access point ACP relays mutual-recognition wireless communication between the printer 1 and the operation terminal 200. This access point ACP is connected to other access points ACP over a network.

The operation terminal 200 is an information terminal such as a personal digital assistant (PDA) as a mobile information terminal having a function corresponding to the mutual-recognition wireless communication, or a smartphone (e.g., a mobile phone having a PDA function), for example. This operation terminal 200 includes a touch screen 201 and operation buttons 202, for example. The touch screen 201 has a display function for displaying various kinds of information and messages on a liquid crystal display. The touch screen 201 is capable of accepting instructions and information input by an operator with the operation buttons 202. Thus, a portion of the touch screen 201 which has the display function will be hereinafter referred to as "display 201", and an operable portion of the touch screen 201 and the operation buttons 202 will be hereinafter referred to as "operation interface 202". The operation terminal 200 transmits print data to the printer 1 over the mutual-recognition wireless communication via the access point ACP to cause the printer 1 to perform printing.

Configuration of Printer

Figure 2:
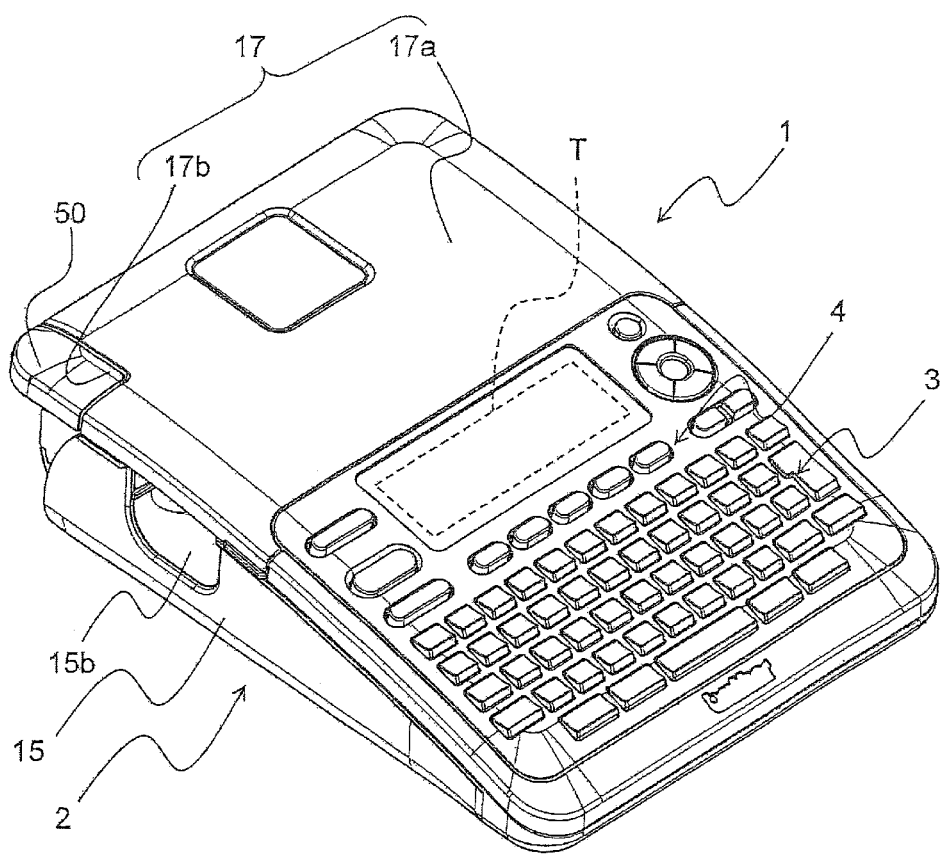
FIG. 2 is a perspective view of the printer.
Figure 3:
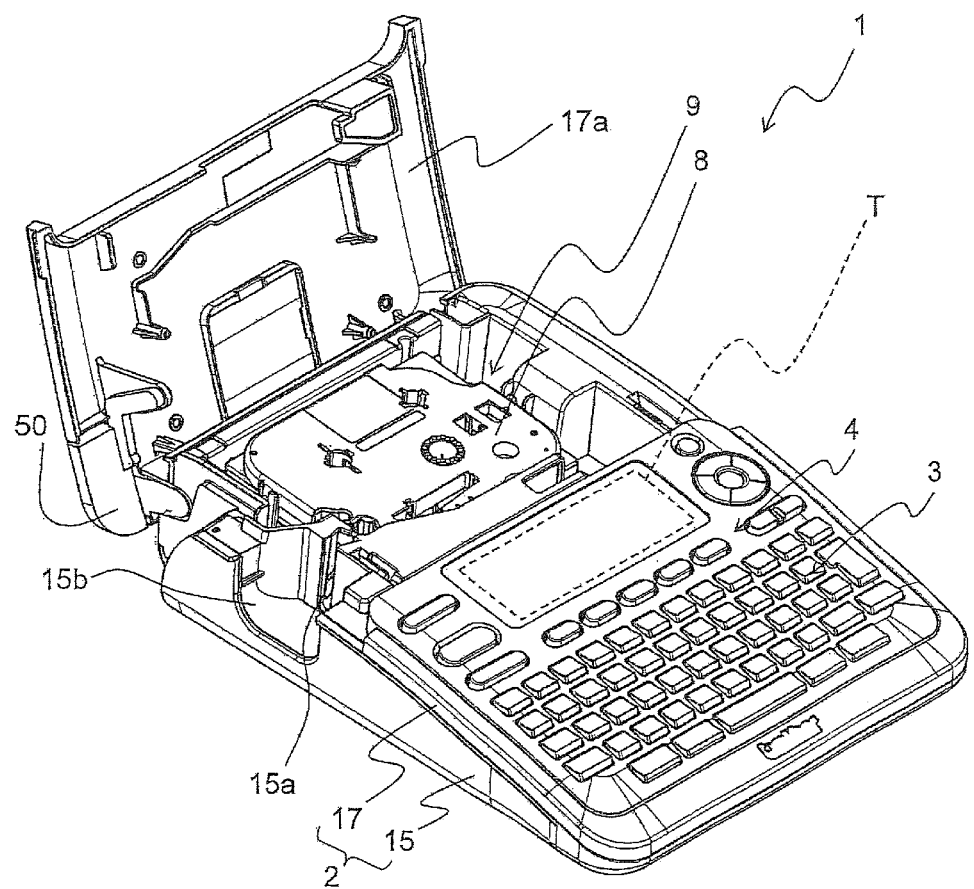
FIG. 3 is a perspective view of the printer, with a cartridge cover being open.

There will be next described a configuration of the printer 1 with reference to FIGS. 2 and 3.

As illustrated in FIGS. 2 and 3, the printer 1 includes a housing 2 forming an external appearance. The housing 2 includes a lower cover 15 formed of resin and constituting a lower and side surfaces of the printer 1; and an upper cover 17 formed of resin and constituting an upper surface of the printer 1.

One of the side surfaces of the lower cover 15 has a recess 15b and an output opening 15a formed at the center of a rear portion of the recess 15b. A printed-label tape 109 (see FIG. 4), which will be described below, is to be discharged through the output opening 15a.

The upper cover 17 is provided with a keyboard 3, a function-key group 4, and an NFC communication interface T. The keyboard 3 is an input interface enabling a user to input characters, for example. The function-key group 4 includes function keys and buttons for achieving various functions of the printer 1, such as a print button and a power button. The NFC communication interface T is installed so as to close a rectangular opening, for example.

The upper cover 17 includes a cartridge cover 17a at a rear portion thereof. The cartridge cover 17a is opened when a cartridge 8 shaped like a tape cassette is mounted and removed. The cartridge cover 17a opens and closes a cartridge holder 9. A cutout 17b is formed in an end portion of the cartridge cover 17a. The cutout 17b accommodates a cut lever 50 that is an operating lever for cutting the printed-label tape 109.

The cartridge 8 is mountable in and removable from the cartridge holder 9 that is provided at a rear portion of the printer 1. This cartridge holder 9 is normally closed by the cartridge cover 17a (see FIG. 2). When the cartridge cover 17a is opened, the cartridge holder 9 is exposed (see FIG. 3).

Figure 4:
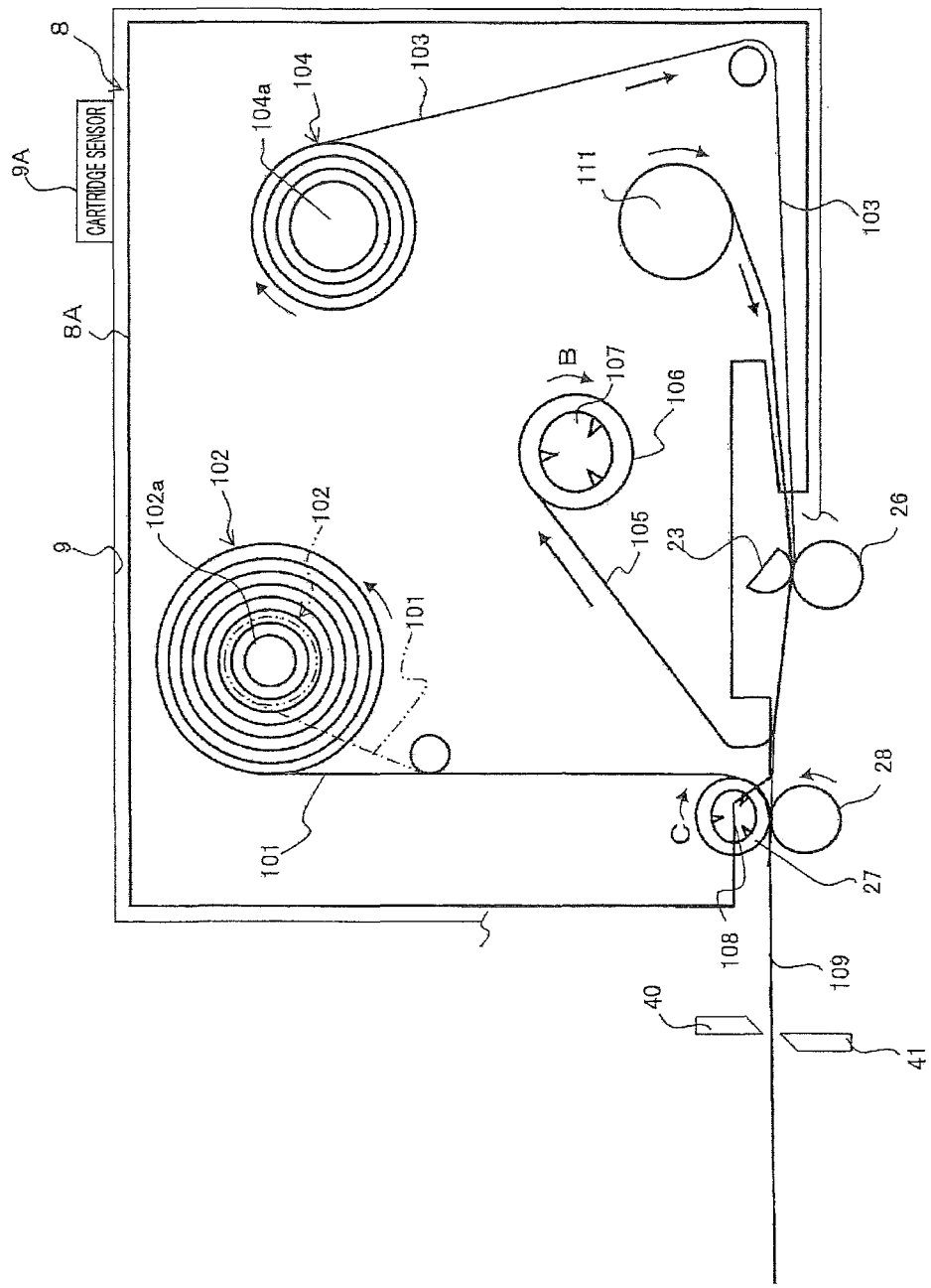
FIG. 4 is a plan view conceptually illustrating an internal structure of a cartridge in the printer.

There will be next described the cartridge 8 and the cartridge holder 9 in detail with reference to FIG. 4.

As illustrated in FIG. 4, the cartridge 8 includes: a housing 8A; a first roll 102 disposed in the housing 8A which is a roll of a strip-shaped substrate tape 101 and has a spiral shape (noted that FIG. 4 illustrates the first roll 102 in the form of concentric circles for simplicity); a second roll 104 which is a roll of a transparent printing tape 103 (one example of a printing medium) having substantially the same width as that of the substrate tape 101 and has a spiral shape (noted that FIG. 4 illustrates the second roll 104 in the form of concentric circles for simplicity); a ribbon-supply-side roll 111 that feeds an ink ribbon 105 (noted that ribbon-supply-side roll 111 is not necessary in the case where the printing tape 103 is of a thermal tape); a ribbon-take-up roller 106 that takes up the ink ribbon 105 after printing; and a tape conveying roller 27 rotatably supported near a tape output portion of the cartridge 8.

The substrate tape 101 of the first roll 102 is wound around a reel member 102a. The substrate tape 101 is constituted by an adhesive layer, a base film, an adhesive layer, and a release paper sheet stacked on one another in this order in a direction directed from an inner side toward an outer side of the first roll 102, for example. The printing tape 103 of the second roll 104 is wound around a reel member 104a.

The tape conveying roller 27 presses and sticks the substrate tape 101 and the printing tape 103 against and to each other to form the printed-label tape 109 while conveying the printed-label tape 109.

A fixed blade 40 and a movable blade 41 are provided downstream of the tape conveying roller 27 and a pressing-contact roller 28 (i.e., downstream of a print head 23 which will be described below) along a path through which the printed-label tape 109 is conveyed. The movable blade 41 is moved forward toward the fixed blade 40 by a manual operation of the cut lever 50 and cooperates with the fixed blade 40 to cut the printed-label tape 109 in its thickness direction.

A ribbon-take-up-roller drive shaft 107 and a tape-conveying-roller drive shaft 108 are provided on the cartridge holder 9. The ribbon-take-up-roller drive shaft 107 takes up the used ink ribbon 105 in the cartridge 8. The tape-conveying-roller drive shaft 108 conveys the printed-label tape 109. The tape-conveying-roller drive shaft 108 is one example of a conveyor and an operation mechanism. When a driving force generated by a motor, not illustrated, for the conveying roller is transmitted to the ribbon-take-up-roller drive shaft 107 and the tape-conveying-roller drive shaft 108, the ribbon-take-up roller 106 and the tape conveying roller 27 are rotated in conjunction with each other. The print head 23 is provided on the cartridge holder 9 so as to be positioned at an opening of the cartridge 8 when the cartridge 8 is mounted. The print head 23 performs printing on the printing tape 103 being conveyed. This print head 23 is one example of the printing device. The print head 23 is spaced apart from the movable blade 41 and the fixed blade 40 at a predetermined distance along the tape conveying path. The cartridge holder 9 is provided with a cartridge sensor 9A configured to detect the type of the cartridge 8 mounted on the cartridge holder 9 in a well-known manner. Specifically, the type of the cartridge 8 indicates the type of the printing tape 103 such as its width and other properties.

Operations for Creating Printed Tape

When the cartridge 8 is mounted on the cartridge holder 9, the printing tape 103 and the ink ribbon 105 are nipped between the print head 23 and a platen roller 26 opposed to the print head 23. The substrate tape 101 and the printing tape 103 are nipped between the tape conveying roller 27 and the pressing-contact roller 28 opposed to the tape conveying roller 27. The ribbon-take-up roller 106 and the tape conveying roller 27 are rotated in synchronization with each other respectively in directions indicated by arrows B and C in FIG. 4. This rotates the tape conveying roller 27, the pressing-contact roller 28, and the platen roller 26 to cause the substrate tape 101 to be drawn from the first roll 102 and supplied to the tape conveying roller 27. The printing tape 103 is drawn from the second roll 104, and a multiplicity of heating elements of the print head 23 are energized by a printing-drive circuit, not illustrated. As a result, printing is performed on a back surface of the printing tape 103.

The substrate tape 101 and the printing tape 103 having been printed are bonded to each other by the tape conveying roller 27 and the pressing-contact roller 28 and formed together as the printed-label tape 109 that is discharged to the outside of the cartridge 8 through the tape output portion.

After printing is performed on the printing tape 103, the ink ribbon 105 is taken up by the ribbon-take-up roller 106 rotated by the ribbon-take-up-roller drive shaft 107.

The printed-label tape 109 discharged to the outside of the cartridge 8 as described above is cut by the fixed blade 40 and the movable blade 41 operated by a manual operation of the cut lever 50, to create a printed label, not illustrated. It is noted that, since the printed-label tape 109 includes the printing tape 103 having been printed as described above, the fixed blade 40 and the movable blade 41 have a function of cutting the printing tape 103 having been printed. In this cutting, as described above, the manual operation of the cut lever 50 by the user is transferred to the movable blade 41 via a mechanism, not illustrated, to move the movable blade 41 forward toward the fixed blade 40 to close the movable blade 41 and the fixed blade 40 like scissors.

Functional Configurations of Printer and Operation Terminal

Figure 5:
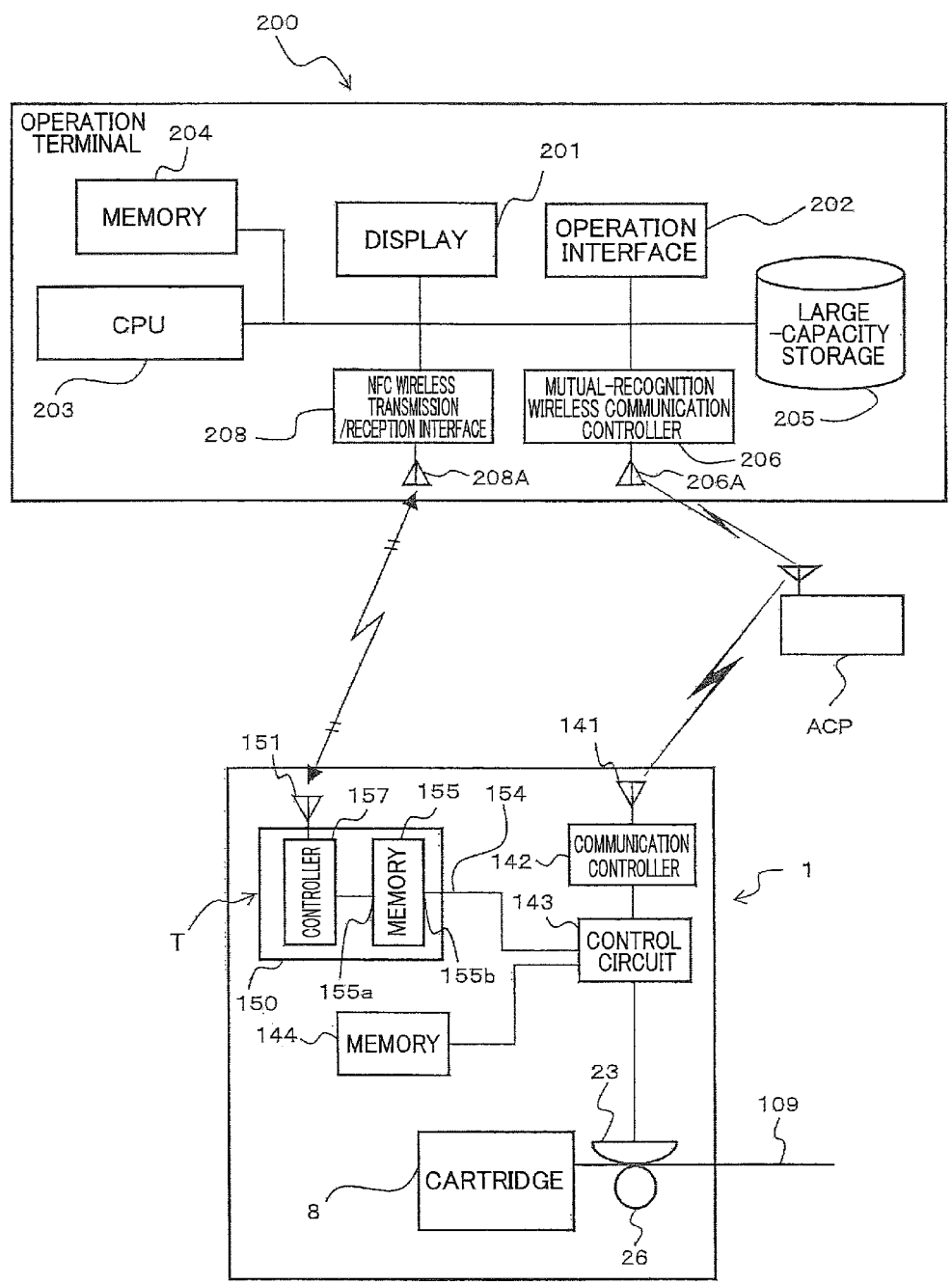
FIG. 5 is a block diagram illustrating functional configurations of a printer and an operation terminal.

There will be next described, with reference to FIG. 5, functional configurations of the printer 1 and the operation terminal 200 for printing.

As illustrated in FIG. 5, the printer 1 includes: the print head 23, such as a thermal line head, configured to perform printing on the printing tape 103; the platen roller 26; a control circuit 143 (as one example of a controller); a memory 144 such as a RAM or a ROM; a communication controller 142 configured to control the mutual-recognition wireless communication performed between the printer 1 and the access point ACP via a printer antenna 141; and the NFC communication interface T (as one example of a communication interface) configured to transmit and receive information over the NFC communication via an NFC antenna 151. The printer antenna 141 is configured to transmit and receive information to and from the access point ACP over the mutual-recognition wireless communication having a communication range longer than that of the NFC communication performed by the NFC antenna 151. The control circuit 143 controls: operation mechanisms including the tape-conveying-roller drive shaft 108 and the print head 23 in the printer 1; and communication interfaces including the NFC communication interface T.

To transmit and receive information to and from the operation terminal 200 over the NFC communication, the NFC communication interface T includes the NFC antenna 151 and an IC circuit 150 connected to the NFC antenna 151, for example.

The NFC antenna 151 is configured to receive instructions from the operation terminal 200 over the NFC communication and in response send the operation terminal 200 information about the type of the cartridge 8 (in other words, information on the type of the printing tape 103), which will be described later in detail. The NFC antenna 151 is configured to send the operation terminal 200 access-point information on the access point ACP which is obtained by the control circuit 143 in advance. Examples of the access-point information include an access point ID which is identification information for identifying the access point ACP, and a password. It is noted that the identification information for identifying the access point ACP is not limited to the access point ID and may be any other information such as a name and/or symbols unique to the access point, for example.

The IC circuit 150 includes an NFC controller 157 and a memory 155 that is a memory of a dual-port type, for example. One port 155a of the memory 155 is connected to the NFC controller 157. The other port 155b of the memory 155 is an external output terminal that is connected to the control circuit 143 via a wired connection interface 154. The memory 155 is capable of storing the received access-point information. The memory 155 and the NFC antenna 151 are controlled by the NFC controller 157.

As illustrated in FIG. 5, the operation terminal 200 includes: a CPU 203 (as one example of a controller); a memory 204 such as a RAM or a ROM; the operation interface 202; the display 201; a large-capacity storage 205 configured to store various kinds of information; a wireless transmission/reception interface 208 for NFC communication (hereinafter may be referred to as "NFC wireless transmission/reception interface 208") which is provided with a first antenna 208A; and a mutual-recognition wireless communication controller 206 provided with a second antenna 206A. The NFC wireless transmission/reception interface 208 is one example of a communication interface.

The CPU 203 controls the NFC wireless transmission/reception interface 208 to be connected to the printer 1 so as to enable transmission and reception of information therebetween over wireless communication (the NFC communication) between the first antenna 208A and the NFC antenna 151 of the NFC communication interface T for the printer 1. The NFC wireless transmission/reception interface 208 receives the access-point information from the printer 1, for example. In this example, short-range wireless communication with a band of 13.56 MHz is used, and its communication range is about several tens of centimeters, for example.

The CPU 203 controls the mutual-recognition wireless communication controller 206 to execute processings for transferring various kinds of information, such as a processing for receiving print data from the operation terminal 200, over the mutual-recognition wireless communication via the second antenna 206A and the access point ACP. In this example, the communication range is longer than that of the NFC communication and ranges between about 10 m and 100 m.

The CPU 203 is configured to execute a signal processing according to programs stored in the ROM while using a temporary storage function of the RAM. The CPU 203 thereby transmits and receives instruction signals and information signals to and from the printer 1. It is noted that the programs stored in that ROM may include a print-processing program, for example.

The large-capacity storage 205 (or the memory 204) stores programs for converting a print instruction to a printer code (noted that detailed description therefor is omitted), for each form such as a style and a font of a character.

In the printer 1 according to the present embodiment, though detailed illustration and description are omitted, all the operation mechanisms (including the tape-conveying-roller drive shaft 108 and the print head 23) and the control circuit 143 and other similar devices are operated by electric power supplied from a battery (a rechargeable battery) held in a battery holder, not illustrated.

Background

In the present embodiment, the user operates an external device connected to the printer 1, such as the operation terminal 200 or a computer, or the printer 1 to instruct the external device or the printer to create print data based on a print layout on the printing tape 103 which is desired by the user (e.g., a print layout created using a template), and the printer 1 performs printing on the printing tape 103 on the created print data, for example. During or after this operation, a malfunction event (hereinafter may be referred to as "error event" or "error") is in some cases caused in the printer 1.

In the case where the printer 1 includes a display, the contents (details) of the error event are displayed on the display and notified to the user. However, in the case where the printer 1 includes an LED lamp or lamps instead of the display, for example, the user needs to interpret the contents of the error event from an illuminating state and/or an illuminating pattern of the LED lamp (e.g., a blinking manner, a color of illumination, and the number of illuminating lamps). In the case where the printer 1 includes no display, the contents of the error event are printed on the printing tape 103 and notified to the user. However, each time when the error event occurs, the high-priced printing tape 103 is wasted. In the case where the printer 1 is connectable to a computer, the user needs to install a particular application in advance on the computer to display the contents of the error event on the computer. Thus, the user has to connect the printer 1 to the computer and install the application, unfortunately.

Operations in Present Embodiment

In the printer 1 according to one embodiment, the user only needs to hold the operation terminal 200 such as a smartphone over the NFC communication interface T of the printer 1 to cause transmission of the contents of the error event from the printer 1 to the operation terminal 200 over the NFC communication. The operation of holding the operation terminal 200 over the NFC communication interface T is one example of an information requesting operation. This operation may be an operation of bringing the operation terminal 200 close to or contact with the NFC communication interface T, for example. In the following description, the operation may be collectively referred to as "holding-over operation". More specifically, when the holding-over operation is performed, the printer 1 determines that the holding-over operation is performed, and the printer 1 collects information from the devices and components of the printer 1. In the case where the error event has occurred, the printer 1 summarizes the contents of the error event as an error report and transmits the error report to the operation terminal 200. As a result, the display 201 of the operation terminal 200 displays the contents of the error event (e.g., the type of each error and the number of errors), thereby easily notifying the user of the contents of the error event.

Notification of Error by Printer 1 according to Present Embodiment

Figure 6:
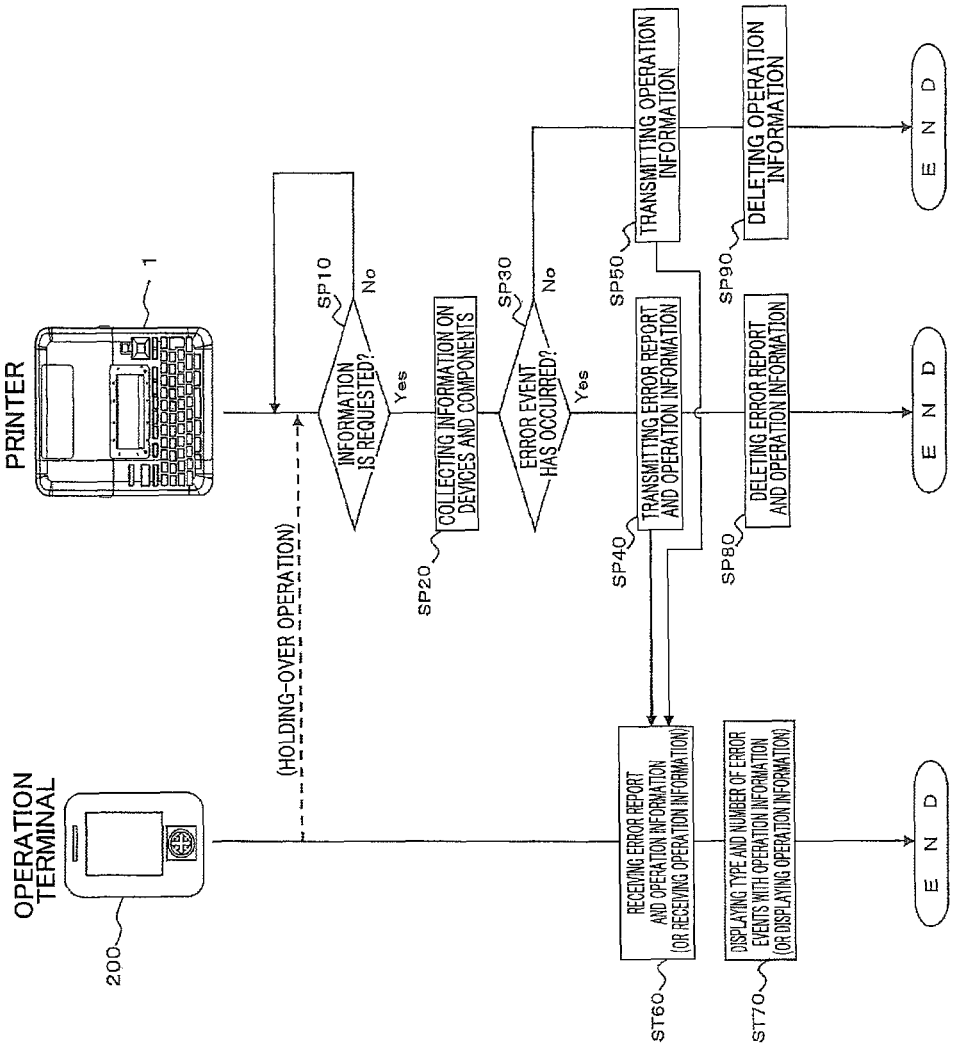
FIG. 6 is a view for explaining operations for transmission/reception of information between the printer and the operation terminal.
Figure 7A:
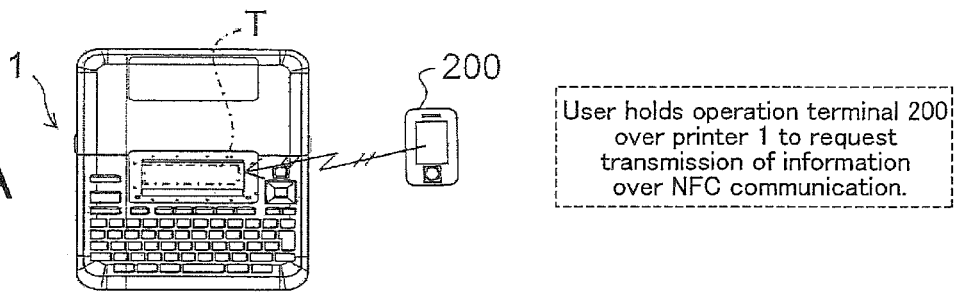
FIGS. 7A through 7C are views for explaining a report in the event of an occurrence of an error in the printer.
Figure 7B:
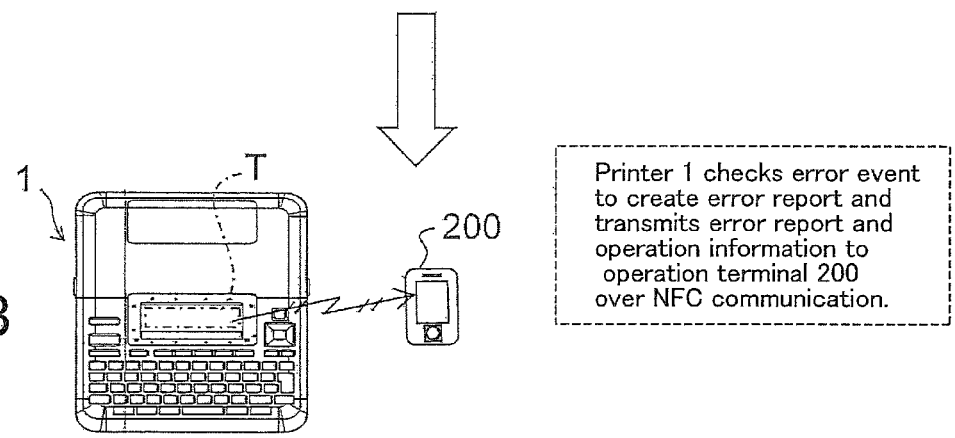
Figure 7C:
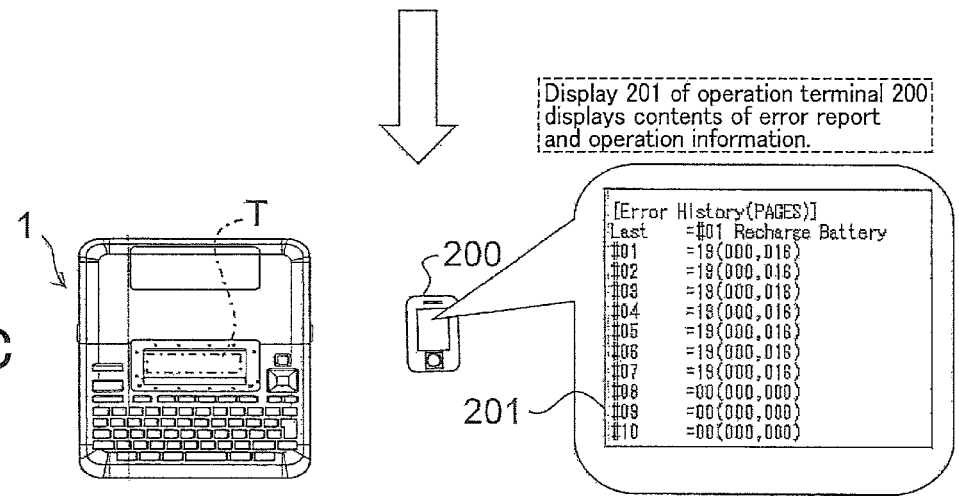
Figure 8:
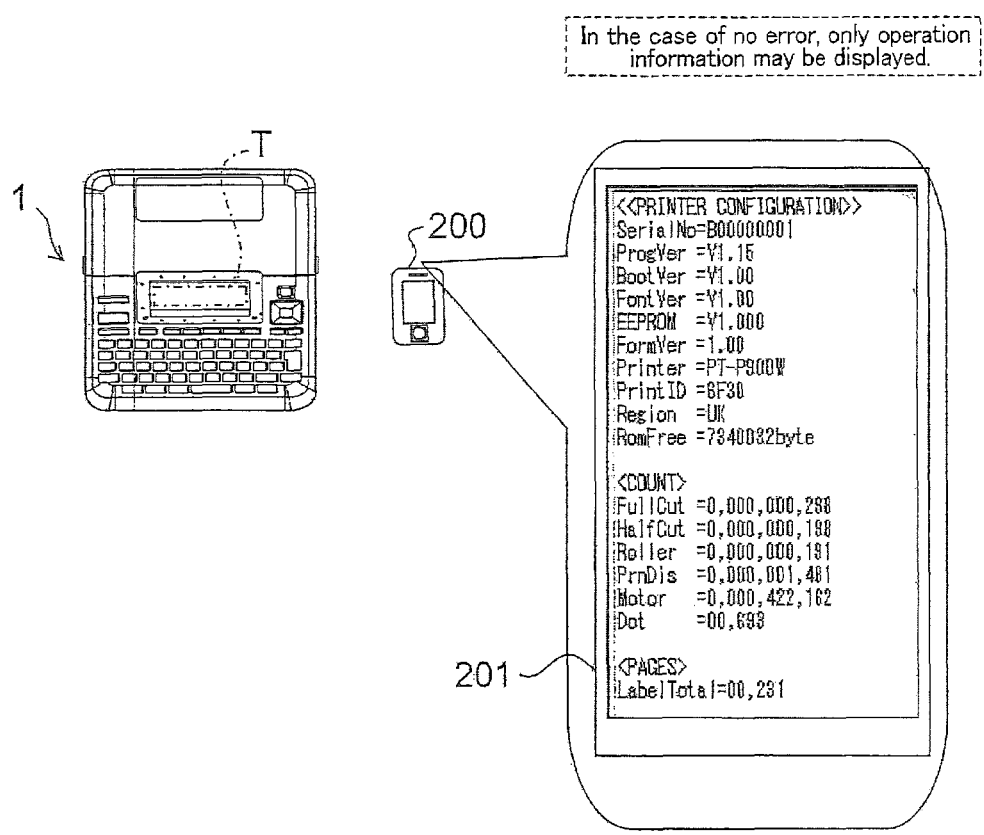
FIG. 8 is a view for explaining a report in the case where no error has occurred in the printer.

There will be next described operations of the printer 1 according to one embodiment with reference to FIGS. 6-8.

As illustrated in FIGS. 6 and 7A, the printer 1 according to the present embodiment when the user has noticed an error event or wants to know an operating state of the printer 1, for example, the user performs the holding-over operation of holding the operation terminal 200 over the NFC communication interface T of the printer 1. While the holding-over operation is one example of the information requesting operation as described above, this information requesting operation is not limited to the holding-over operation as long as a state in which the operation terminal 200 is in contact with or close to the NFC communication interface T is established. User's motivation for the holding-over operation is not limited in particular.

When the holding-over operation is performed, the NFC communication interface T communicates with the NFC wireless transmission/reception interface 208 via the first antenna 208A of the operation terminal 200 and the NFC antenna 151. When the communication between the NFC communication interface T and the operation terminal 200 is established or when a predetermined signal is received from the operation terminal 200, for example, the NFC communication interface T outputs a signal related to the holding-over operation, to the control circuit 143.

As illustrated in FIG. 6, the control circuit 143 of the printer 1 executes a processing at SP10 periodically or at a particular timing, for example The processing at SP10 is one example of a request determining processing. At SP10, the control circuit 143 determines whether the holding-over operation is performed on the operation terminal 200. When a signal related to the holding-over operation is received from the NFC communication interface T, for example, the control circuit 143 determines that the holding-over operation is performed (SP10: YES), and when the signal is not received (SP10: NO), the control circuit 143 determines that the holding-over operation is not performed. When the control circuit 143 determines that the holding-over operation is not performed, the control circuit 143 maintains a standby state in which the processing at SP10 is repeated. When the control circuit 143 determines that the holding-over operation is performed, the control circuit 143 executes a processing at SP20. The control circuit 143 at SP20 collects operation information relating to the operation mechanisms, including the tape-conveying-roller drive shaft 108 and the print head 23 in the printer 1, and the control circuit 143. The control circuit 143 thereafter executes a processing at SP30.

The processing at SP30 is one example of an error determining processing. The control circuit 143 at SP30 determines that an error event or events are caused in at least one of (i) at least one operation mechanism including the tape-conveying-roller drive shaft 108 and the print head 23 in the printer 1, and (ii) the control circuit 143.

The control circuit 143 at SP30 executes a diagnosing processing for the inside of the printer 1 to determine whether the error event has occurred, and identify the error event, for example.

The diagnosing processing may be any processing and is not limited in particular. Examples of the error event include: a small remaining amount of battery charge (battery weak); running out of battery charge (battery empty); running out of the printing tape 103 or other materials (tape end); an operational malfunction in the movable blade 41 (cutter error); an error in conveyance of the printing tape 103 or other materials (tape jam); overheat of the print head 23 (head high-temperature error); and a system malfunction such as a failure of start-up of the control circuit 143 and a hang-up (system error). The contents of the error event are not limited in particular. Examples of the operation information include printer-body information, detailed-version data, cutting data, and the number of printings. The contents of the operation information are not limited in particular.

When the control circuit 143 at SP30 determines that the error event has occurred, the control circuit 143 executes processings at SP40 and SP80. When the control circuit 143 at SP30 determines that the error event has not occurred, the control circuit 143 executes processings at SP50 and SP90.

The processing at SP40 is one example of an error transmitting processing and an operation transmitting processing. The processing at SP50 is another example of the operation transmitting processing. The processing at SP80 is one example of a first deleting processing and a second deleting processing. The processing at SP90 is another example of the second deleting processing. That is, the control circuit 143 at SP50 executes only the operation transmitting processing and at SP40 executes not only the operation transmitting processing but also the error transmitting processing. The control circuit 143 may at SP40 execute only the error transmitting processing without executing the operation transmitting processing. The control circuit 143 at SP90 executes only the second deleting processing and at SP80 executes not only the second deleting processing but also the first deleting processing. In the case where the control circuit 143 at SP40 executes only the error transmitting processing without executing the operation transmitting processing, the control circuit 143 at SP80 executes only the first deleting processing without executing the second deleting processing. Here, the processings at SP50 and SP90 will be described first, and the processings at SP40 and SP80 will be described thereafter.

When the control circuit 143 at SP30 determines that the error event has not occurred, the control circuit 143 at SP50 transmits the operation information to the operation terminal 200 via the NFC communication interface T (as one example of the operation transmitting processing). The control circuit 143 thereafter executes the processing at SP90.

The control circuit 143 at SP90 deletes the contents of the operation information at an appropriate timing after execution of the processing at SP50 (as one example of the second deleting processing). The printer 1 terminates communication with the operation terminal 200 after the processing at SP90.

When the control circuit 143 at SP30 determines that the error event has occurred, as illustrated in FIG. 7B, the control circuit 143 at SP40 transmits the operation information to the operation terminal 200 via the NFC communication interface T as in the processing at SP50 and transmits the error report including the type and the number of the error events having occurred, to the operation terminal 200 via the NFC communication interface T (as one example of the error transmitting processing). After the processing at SP40, the control circuit 143 executes the processing at SP80.

As in the processing at SP90, the control circuit 143 at SP80 deletes the contents of the operation information at an appropriate timing after execution of the processing at SP40 and deletes the contents of the error report (as one example of the first deleting processing). The printer 1 terminates communication with the operation terminal 200 after the processing at SP80.

Error Notifying Operation of Operation Terminal 200 in Present Embodiment

When at least one of the error report and the operation information is transmitted at SP40 or SP50 from the NFC communication interface T of the printer 1 over the NFC communication, the operation terminal 200 executes a communication-processing program. The operation terminal 200 executes the communication-processing program to execute processings at ST60 and ST70.

The processing at ST60 is one example of a receiving processing. As illustrated in FIG. 7B, the operation terminal 200 at ST60 receives the error report created by the printer 1, via the NFC wireless transmission/reception interface 208. That is, as described above, in the case where the printer 1 has executed the processing at SP40 to transmit the error report, the operation terminal 200 receives this error report. The operation terminal 200 at ST60 receives the operation information about the printer 1, via the NFC wireless transmission/reception interface 208. That is, in the case where the operation information is transmitted from the printer 1 at SP40 or SP50 as described above, the operation terminal 200 receives the operation information. After the processing at SP60, the operation terminal 200 executes the processing at ST70.

The processing at ST70 is one example of a display processing. As illustrated in FIGS. 7C and 8, the operation terminal 200 at ST70 controls the display 201 to display (i) the type and the number of the error events contained in the received error report and (ii) the contents of the received operation information.

FIG. 7C illustrates one example of a screen displayed on the display 201 in the case where the error report and the operation information are transmitted from the printer 1. As illustrated in FIG. 7C, in the case where both of the error report and the operation information are received, the operation terminal 200 is capable of controlling the display 201 to display not only the type and the number of the error events contained in the error report but also the contents of the operation information. In the case where both of the error report and the operation information are received, the operation terminal 200 may control the display 201 to display only the type and the number of the error events contained in the error report, may control the display 201 to display only the contents of the operation information, and may instruct the user to select which of (i) the type and the number of the error events and (ii) the contents of the operation information, to be displayed.

In the screen on the display 201 in FIG. 7C, the first line "Error History (PAGES)" represents that the error events are being displayed, and the second line "Last =#01 Recharge Battery" represents one of the error events. The characters "Last" represent that the error event in this line is the last one of the error events contained in the error report. The characters "#01" represent the ordinal number of the error event in this line among the error events contained in the error report. The characters "Recharge Battery" represent reduction in the remaining amount of battery charge as the type of the error event. Thus, the error report displayed on the display 201 includes a list of the error events each including the ordinal number of the error event and at least one of a text and the number indicating the type of the error event, for example. In the case where the error report includes a plurality of the error events, for example, the error events may be displayed in a list form such that the ordinal number of the error event expressed last represents the number of the error events. In the screen displayed on the display 201 in FIG. 7C, each of the characters "#01=19 (000, 016)", the characters "#02=19 (000, 016)", and so on listed in the third and subsequent lines represent the contents of the operation information such as a state of the operation mechanism, for example.

As illustrated in FIG. 7C, in the case where the operation terminal 200 controls the display 201 to display both (i) the type and the number of the error events contained in the error report and (ii) the contents of the operation information, the information may be displayed on the display 201 in a manner in which a higher priority is given to the error events than to the operation information. In FIG. 7C, the error events are displayed at the uppermost portion of the screen as one example of the manner in which a higher priority is given to the error events, but the manner in which a higher priority is given to the error events is not limited to this example. Any manner may be applied as long as the user can visually recognize the error events more easily than the other information. For example, only the error events may be written in red or in bold type, and the font or the background color of the error events may be changed, for example, for easy recognition by the user.

FIG. 8 illustrates one example of a screen displayed on the display 201 in the case where only the operation information is transmitted from the printer 1. As illustrated in FIG. 8, in the case where only the operation information is received, the operation terminal 200 may display only the contents of the operation information on the display 201. In the example of a screen on the display 201 in FIG. 8, the first line "<<PRINTER CONFIGURATION>>" represents a display of settings of the printer 1. The second line "Serial No" represents the serial number of the printer 1. The third and subsequent lines represent the versions of programs and an EEPROM, the model number and an ID of the printer, a destined country (UK in FIG. 8), an available space in the ROM, and so on. The characters "<COUNT>" represent a display of states such as the number of printings. The display of the states such as the number of printings includes the number of cuttings performed by the movable blade 41, the number of rotations of the tape-conveying-roller drive shaft 108, and the number of rotations of the motor, not illustrated, for the conveying roller. The characters "<PAGES>" represents the total number of created printed label.

Effects

The printer 1 according to one embodiment has been described above. In the present embodiment, in the event of occurrence of a malfunction event (error event) in the printer 1, the printer 1 performs wireless communication with the operation terminal 200 via the NFC communication interface T to send the operation terminal 200 information relating to the error event. That is, when the operation terminal 200 is brought close to or brought into contact with the NFC communication interface T by the user (in other words, the information requesting operation is performed), the control circuit 143 determines whether the information requesting operation is performed (as one example of the request determining processing). When a positive decision is made, the control circuit 143 determines whether the error event has occurred in the operation mechanism, such as the tape-conveying-roller drive shaft 108 and the print head 23, or the controller such as the control circuit 143 (as one example of the error determining processing). When the control circuit 143 determines that the error event has occurred, the control circuit 143 creates the error report including the type and the number of the error events having occurred and transmits the error report to the operation terminal 200 via the NFC communication interface T (as one example of the error transmitting processing). After the error report is received by the operation terminal 200, the contents of the error events (e.g., the type and the number) contained in the error report can be displayed on the display 201.

With this configuration, in the present embodiment, the user only needs to bring the operation terminal 200 into contact with or close to the NFC communication interface T at a desired timing to display the contents of the error events on the operation terminal 200. This enables the user to easily recognize the contents of the error events. This reduces a burden on the user and thereby improves convenience to the user when compared with a printer not including a display for displaying the contents of the error event, specifically, with a case where the user needs to identify the contents of the error event by checking an illuminating pattern of LEDs against a product manual, a case where the user needs to instruct the printer to print the contents of the error event, or a case where the user needs to operate a PC connected to the printer to display the contents of the error event with a specific application installed in the PC.

In the printer 1 as one example of the electronic apparatus, the control circuit 143 controls the conveyor including the tape-conveying-roller drive shaft 108 to convey the printing tape 103 and controls the printing device including the print head 23 to perform printing on the conveyed printing tape 103 to create a printed material. During or after this operation, a malfunction event is in some cases caused in the printer 1. In the present embodiment, in these cases, the user only needs to bring the operation terminal 200 into contact with or close to the NFC communication interface T at a desired timing to display the contents of the error events on the operation terminal 200. Since this enables the user to easily recognize the contents of the error events, it is possible to reduce a burden on the user, resulting in improved convenience to the user.

In the printer 1 according to the present embodiment, the user only needs to bring the operation terminal 200 into contact with or close to the NFC communication interface T at a desired timing to cause the operation terminal 200 to display details of the operation information relating to the operation mechanisms or the controller (e.g., an operation history of the components and devices of the printer 1, information relating to the printing tape 103, and information relating to the control program of the printer 1). This enables the user to easily recognize the contents of the operation information, thereby further improving the convenience to the user when compared with a case where the user needs to operate the printer 1 to print the contents of the operation information.

In the present embodiment, when the operation terminal 200 displays the contents of the error events and the contents of the operation information, the contents are displayed in the manner in which a higher priority is given to the error events than to the operation information. This enables the user to visually recognize an occurrence of an error event in the printer 1 easily and reliably.

The printer 1 according to the present embodiment deletes the contents of the collected error events after transmitting the error report (as one example of the first deleting processing) and deletes the collected operation information after transmitting the operation information (as one example of the second deleting processing). With this configuration, the contents of the error events and the contents of the operation information which are collected from the devices of the printer 1 and contained in the error report as described above are prevented from being carelessly obtained from other persons over wireless communication after transmission of the error report and the operation information.

While the embodiment has been described above, it is to be understood that the disclosure is not limited to the details of the illustrated embodiment, but may be embodied with various changes and modifications, which may occur to those skilled in the art, without departing from the spirit and scope of the disclosure.

First Modification

Figure 9:
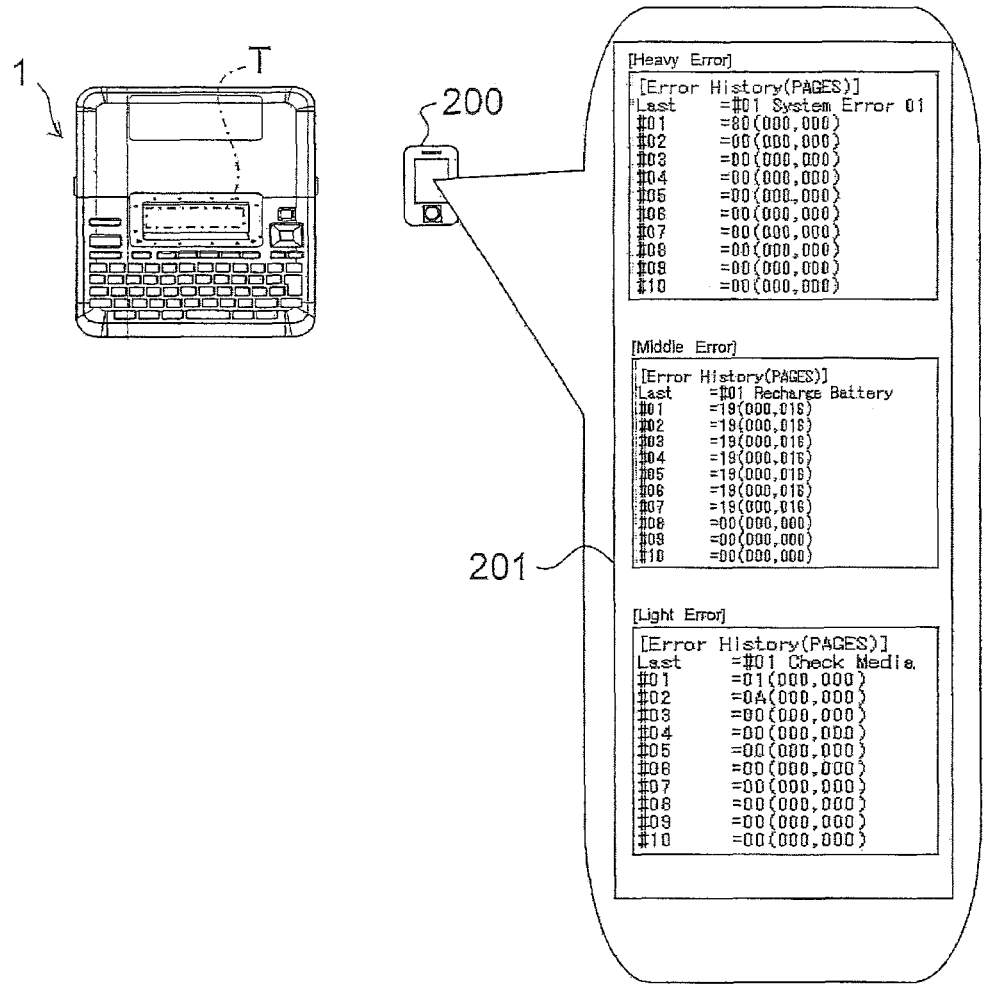
FIG. 9 is a view for explaining a report in the event of an occurrence of an error in a printer according to a first modification.

There will be next described a first modification with reference to FIG. 9.

While FIG. 7C illustrates one example of a display screen including one error event in the above-described embodiment, the error report may contain a plurality of error events as described above. In the present modification, as illustrated in FIG. 9, there are a plurality of error events, the error events are displayed so as to be divided according to the type of the error events. One example of the type is a degree of difficulty (e.g., heavy, middle, and light). More specifically, in the case where the error report contains a plurality of error events, the operation terminal 200 controls the display 201 in the processing at ST70 in FIG. 6 (as one example of the display processing) to display and list the error events by the type related to the degree of difficulty in resolving the error event as illustrated in FIG. 9. It is noted that the characters "Heavy Error" in FIG. 9 (as one example of an indication of the degree of difficulty) represent that the degree of difficulty in resolving the error event is heavy, and are displayed on the display 201 so as to be associated with the error event "System Error". Likewise, the characters "Middle Error" representing that the degree of difficulty in resolving the error event is middle are displayed so as to be associated with the error event "Recharge Battery", and the characters "Light Error" representing that the degree of difficulty in resolving the error event is light are displayed so as to be associated with the error event "Check Media".

Examples of the type related to the degree of difficulty in resolving the error event include: a small (light) degree of difficulty in which the error event can be resolved in a short time by a normal operation of the user without the need of additional resolving operation; a middle degree of difficulty in which the error event can be resolved by a resolving operation of the user according to procedure information obtained by a web site or a manual produced by a manufacturer, for example; and a large (heavy) degree of difficulty in which the error event cannot be resolved by the user and requires an inquiry to the manufacturer, for example. It is noted that the control circuit 143 may determine which degree of difficulty the error event identified at SP30 is assigned to among the small, middle, and large degrees of difficulty, based on a determination criterion stored in the memory 144 in advance. In the case where the control circuit 143 determines the degree of difficulty in resolving the error event, the error event and the degree of difficulty in resolving the error event are associated with each other and contained in the error report that is transmitted to the operation terminal 200. The CPU 203 of the operation terminal 200 controls the display 201 to display an indication of the degree of difficulty in resolving the error event, based on the transmitted degree of difficulty. The degree of difficulty in resolving the error event may be determined by the CPU 203 of the operation terminal 200. That is, the CPU 203 may receive the error report from the printer 1 and determine the degree of difficulty in resolving the error event contained in the error report, based on a determination criterion stored in the memory 204 in advance.

FIG. 9 illustrates (i) a system malfunction (#01 System Error 01) as one example of the large degree of difficulty, (ii) reduction in remaining amount of battery charge (#01 Recharge Battery) as one example of the middle degree of difficulty, and (iii) running out of the printing tape 103 (#01 Check Media) as one example of the small degree of difficulty. In an indication displayed on the display 201 for each type in FIG. 9, as in FIG. 7C, the operation information is displayed so as to follow the error event. However, the operation information may be displayed independently of the error event.

In the present modification, the user can visually easily recognize the error events having occurred in the printer 1, which are classified into: the error event that can be resolved by the user in a short time; the error event that requires the user to access the site to resolve the error event; and the error event that cannot be resolved by the user alone and requires an inquiry to a customer support center or a call center of the manufacturer of the printer 1, for example.

It is noted that the system malfunction (#01 System Error 01) as one example of the error event with a large degree of difficulty is caused in the event of an occurrence of a failure of start-up of the control circuit 143 and a hang-up, for example. In this case, the control circuit 143 at SP20 cannot normally collect information in the printer 1. In contrast, since an electromotive force is generated in the NFC controller 157 of the NFC communication interface T of the printer 1 by NFC communication from the operation terminal 200, this NFC controller 157 may serve as a controller configured to execute the processing at SP20. That is, in the case where the NFC controller 157 transmits the signal related to the holding-over operation to the control circuit 143 and thereafter does not receive information at SP40 or SP50, such as the error report, from the control circuit 143, the NFC controller 157 may determine that an error with a large degree of difficulty is caused in operations of the control circuit 143, and execute the processing at SP40 to transmit the system malfunction (#01 System Error 01) to the operation terminal 200.

Second Modification

Figure 10:
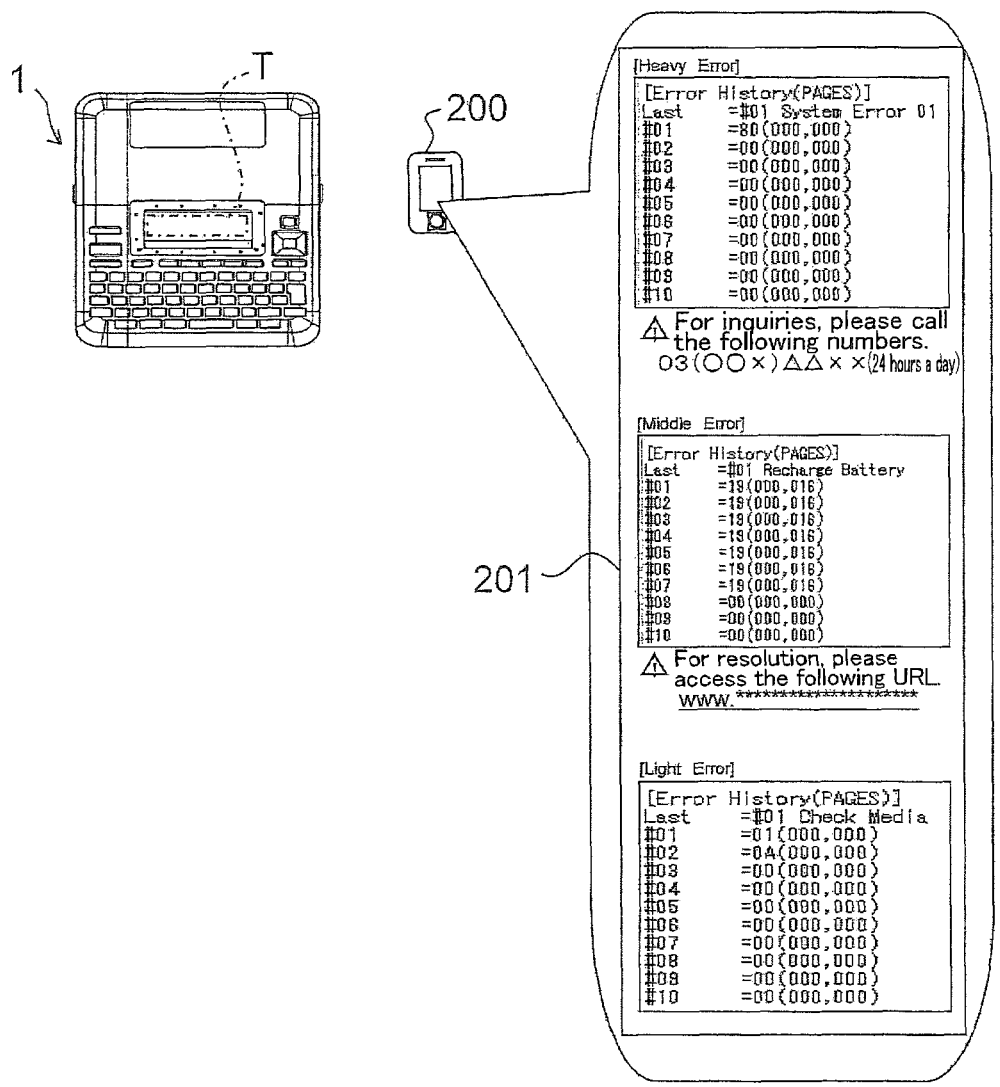
FIG. 10 is a view for explaining a report in the event of an occurrence of an error in a printer according to a second modification.

There will be next described a second modification with reference to FIG. 10.

While the error report contains the type or types and the number of the error events in the above-described embodiment and first modification, the present disclosure is not limited to this example. For example, the error report may contain at least one of (i) site-access information (e.g., a URL) about an access to a web site that provides a method of resolving the error event and (ii) contact information for inquiring about the method of resolving the error event (e.g., a telephone number or an e-mail address of a customer support center or a call center of the manufacturer of the printer 1). FIG. 10 illustrates a case where the error report contains both of the site-access information and the contact information, and the operation terminal 200 at ST70 controls the display 201 to display the site-access information and the contact information.

With this configuration, the display 201 of the operation terminal 200 displays the site-access information and the contact information with error information, for example. This enables the user to easily resolve the error event by accessing a web site using the site-access information to obtain procedure information on a resolving method or by inquiring of the call center using the contact information. In particular, in the case where a text indicating a URL of the site, a telephone number, or an e-mail address is displayed on the display 201 of an information terminal such as a smartphone, the user only needs to perform a tapping operation on the text to access the web site and display the method of resolving the error event or to call the telephone number (or send a mail to the e-mail address) to inquire about the method of resolving the error event. Thus, in the case where the error event is an event which can be resolved by the user alone, the user can easily access the web site, and even in the case where the error event is an event which cannot be resolved by the user alone, the user can easily make an inquiry, thereby speedily resolving the error event, resulting in improved convenience to the user.

In the case where the error report contains both of the site-access information and the contact information, the display 201 of the operation terminal 200 may at ST70 display the error event and the site-access information or the contact information corresponding to the error event, depending upon the degree of difficulty in resolving the error event. In FIG. 10, as in FIG. 9 (the first modification), a plurality of error events are displayed on the display 201 so as to be listed by the type related to the degree of difficulty in resolving the error event. In FIG. 10, the display 201 displays not only the error events but also the site-access information or the contact information in accordance with the type related to the degree of difficulty in resolving the error event. That is, in FIG. 10, since it is difficult for the user alone to resolve the error event with the large degree of difficulty, the display 201 displays a message and a telephone number of a call center which is contained in the contact information, making it possible to guide the user to an inquiry to the call center. Since the error event with the middle degree of difficulty can be resolved by the resolving operation of the user alone, the display 201 displays a message and a URL of a web site providing an operation procedure, which is contained in the site-access information, making it possible to guide the user to the web site.

Others

In another modification, in the case where the control circuit 143 of the printer 1 at SP30 determines that a plurality of error events are caused, the control circuit 143 may determine whether a combination of the error events is a complex error. The complex error is an error that is constituted by a plurality of error events relating to each other and that cannot be resolved unless all the error events are resolved at one time. In the event of an occurrence of the complex error, the control circuit 143 incorporates an indication of the complex error into the error report. Upon receiving the error report, the operation terminal 200 may display error information on the display 201 so as to clearly indicate that a plurality of error events constitute the complex error or so as to emphasize a plurality of error events constituting the complex error. Examples of the clear indication include: displaying the error events constituting the complex error in one line; and displaying a sign or a message indicating the complex error, with each error event. Examples of the emphasized display include: changes in font or form among the error events constituting the complex error; and drawing a box around each error event.

While the printer 1 as one example of the electronic apparatus is driven by the battery in the above-described embodiment and modifications, the electronic apparatus according to the present disclosure is not limited to this example. That is, the electronic apparatus may be any of a printer that is driven by electric power supplied from a power code and a printer of any other type. Furthermore, the present disclosure may be applied to devices other than the printer as long as the devices are electronic apparatuses including an operation mechanism and a controller. Examples of the devices include a digital camera, a personal computer, a measurement device, a clock, an information device, a communication device, a control device, and various kinds of machinery. The same effects can be obtained by the devices to which the present disclosure is applied.

While the NFC is used as the standard for the short-range wireless communication, any other standard may be used for the short-range wireless communication.

In the above-described description, each of the wordings "orthogonal", "parallel", "planar", and so on is not used in a strict sense. That is, tolerance and error in designing and manufacturing are allowed for these wordings, and the wordings "orthogonal", "parallel", "planar", and so on respectively mean "substantially orthogonal", " substantially parallel", " substantially planar", and so on.

While the terms "the same", "equal", "different", and the like may be used for dimensions and sizes in external appearance in the above-described description, these terms are not strictly used. That is, tolerance and error in design and manufacture are allowed, and "same", "equal", and "different" may be respectively interpreted as "substantially the same", "substantially equal", and "substantially different".

Processings achieved by the present disclosure are not limited to the flows illustrated in FIG. 6. The processings may be added, removed, altered, combined, and reordered without departing from the spirit of the scope of the present disclosure.

The techniques in the above-described embodiment and modifications may be used in any combinations.

The disclosure is not limited to the details of the illustrated embodiment and modifications, but may be embodied with various changes and modifications, which may occur to those skilled in the art, without departing from the spirit and scope of the disclosure.

What is claimed is:

1. An electronic apparatus, comprising:
    at least one operation mechanism;
    a communication interface configured to communicate, over short-range wireless communication, with an operation terminal having been brought into contact with or having approached the communication interface; and
    a controller configured to control the at least one operation mechanism and the communication interface,
    wherein the controller is configured to perform:
        executing a signal outputting processing in which the controller controls the communication interface to output a signal for requesting establishment of the short-range wireless communication;
        executing a communication-establishment determining processing in which the controller determines whether the short-range wireless communication is established by the communication interface with the operation terminal; and
        after the short-range wireless communication with the operation terminal is established, executing a request determining processing in which the controller determines whether a transmission-request instruction for transmission of information is received from the operation terminal over the established short-range wireless communication,
    wherein the controller is configured to perform:
        when the controller determines that the transmission-request instruction for transmission of information is received, (a) executing an information obtaining processing in which the controller obtains operation information relating to the at least one operation mechanism and the controller
        (b) executing an error determining processing in which the controller determines based on the obtained operation information whether an error event has been caused in at least one of the controller and one of the at least one operation mechanism; and
        when the controller determines that the error event has been caused, (c) executing an error transmitting processing at which the electronic apparatus transmits an error report comprising a type of the caused error event, to the operation terminal via the communication interface over the established short-range wireless communication; and
        when the controller determines that the transmission-request instruction for transmission of information is not received, not transmitting the error report even though the short-range wireless communication is established between the communication interface and the operation terminal, and
    wherein, when the controller determines that the error event has been caused, the controller obtains the error report comprising the error event and the operation information, and transmits the error report and the operation information to the operation terminal, a content of the error event being displayed upper than contents of the operation information on a display of the operation terminal.

2. The electronic apparatus according to claim 1, wherein the error report comprises the number of error events each as the caused error event.

3. The electronic apparatus according to claim 1, wherein the communication interface is configured to communicate with the operation terminal in a communication method defined by a near field communication (NFC) standard.

4. The electronic apparatus according to claim 1,
    wherein the electronic apparatus is a printing apparatus, and
    wherein the at least one operation mechanism comprises:
        a conveyor configured to convey a printing medium; and
        a printing device configured to perform printing on the printing medium.

5. The electronic apparatus according to claim 1, wherein the error report comprises site-access information about a site providing a method of resolving the error event.

6. The electronic apparatus according to claim 1, wherein the error report comprises contact information for inquiring about a method of resolving the error event.

7. The electronic apparatus according to claim 1, wherein the error report comprises information indicating a degree of difficulty in resolving the error event.

8. The electronic apparatus according to claim 1, wherein the controller is configured to, after completion of the error transmitting processing, execute a first deleting processing in which the controller deletes a content of the error report from the electronic apparatus.

9. The electronic apparatus according to claim 1, wherein the controller is configured to, in at least a former one of a case where the controller determines that the error event has not been caused and a case where the controller determines that the error event has been caused, execute an operation transmitting processing in which the electronic apparatus transmits the operation information relating to the at least one operation mechanism and the controller, to the operation terminal via the communication interface.

10. The electronic apparatus according to claim 9, wherein the controller is configured to, after completion of the operation transmitting processing, execute a second deleting processing in which the controller deletes a content of the operation information from the electronic apparatus.

11. A non-transitory storage medium storing a program readable by a computer of an operation terminal,
    wherein the operation terminal comprises:
        a display configured to display information; and
        a communication interface configured to communicate with an electronic apparatus over short-range wireless communication,
    wherein when executed by the computer, the program causes the operation terminal to perform:
        executing a signal outputting processing in which the communication interface outputs a signal for requesting establishment of the short-range wireless communication;
        executing a communication-establishment determining processing in which the operation terminal determines whether the short-range wireless communication is established by the communication interface with the electronic apparatus;
        after the short-range wireless communication with the electronic apparatus is established, executing a transmission-request-instruction transmitting processing in which the operation terminal transmits a transmission-request instruction for transmission of information, to the electronic apparatus over the established short-range wireless communication;

executing a receiving processing in which the operation terminal receives an error report comprising a type of an error event having been caused in the electronic apparatus and operation information relating to at least one operation mechanism and a controller of the electronic apparatus, via the communication interface over the established short-range wireless communication; and executing a display processing in which the operation terminal controls the display to display a content of the error event which is contained in the received error report and contents of the operation information in a manner in which the content of the error event is displayed upper than the contents of the operation information on the display.

12. The non-transitory storage medium according to claim 11, wherein the error report comprises the number of error events each as the caused error event.

13. The non-transitory storage medium according to claim 11, wherein the communication interface is configured to communicate with the electronic apparatus in a communication method defined by a near field communication (NFC) standard.

14. The non-transitory storage medium according to claim 11, wherein when executed by the computer, the program causes the operation terminal to, when the error report comprises a plurality of error events each as the error event, control the display in the display processing to display the plurality of error events such that the plurality of error events are classified according to a type related to a degree of difficulty in resolving the error event.

15. The non-transitory storage medium according to claim 14, wherein when executed by the computer, the program causes the operation terminal to control the display in the display processing to display a difficulty indication indicating the degree of difficulty in resolving the error event, such that the difficulty indication is associated with the type of the error event.

16. The non-transitory storage medium according to claim 11, wherein the error report comprises site-access information about a site providing a method of resolving the error event, or contact information for inquiring about a method of resolving the error event, and wherein when executed by the computer, the program causes the operation terminal to control the display in the display processing to display access indication indicating one of the site-access information and the contact information, such that the access indication is associated with the type of the error event.

17. The non-transitory storage medium according to claim 11, wherein, in a case where the error report comprises a first error event and a second error event each as the error event and a degree of difficulty of the first error event is heavier than that of the second error event, the first error event is displayed upper than the second error event on the display in the display processing.

* * * * *